(12) United States Patent
Kim et al.

(10) Patent No.: US 6,801,711 B1
(45) Date of Patent: Oct. 5, 2004

(54) METHOD AND APPARATUS FOR CREATING AND RECORDING MANAGEMENT INFORMATION FOR DIGITAL DATA STREAMS

(75) Inventors: Byungjin Kim, Kyunggi-do (KR); Kangsoo Seo, Kyunggi-do (KR); Jea-Yong Yoo, Seoul (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/435,362

(22) Filed: Nov. 8, 1999

(30) Foreign Application Priority Data

Nov. 8, 1998 (KR) .............................................. 98-48097

(51) Int. Cl.[7] .............................. H04N 7/04; H04N 7/06; H04N 7/08; H04N 7/52; H04N 5/85; H04N 5/90; H04N 5/91; H04N 5/780

(52) U.S. Cl. .......................... 386/69; 386/95; 386/125

(58) Field of Search ................................. 386/1, 45, 95, 386/98, 125, 126, 68–70; 348/423.1

(56) References Cited

U.S. PATENT DOCUMENTS 5,835,668 A * 11/1998 Yanagihara .................. 386/95
6,028,726 A * 2/2000 Yanagihara .................. 360/48
6,078,727 A * 6/2000 Saeki et al. ................. 386/125
6,341,196 B1 * 1/2002 Ando et al. .................. 386/95
6,584,278 B2 * 6/2003 Ando et al. .................. 386/98

* cited by examiner

Primary Examiner—Thai Tran
Assistant Examiner—Polin Chieu
(74) Attorney, Agent, or Firm—Birch, Stewart, Kolasch & Birch, LLP

(57) ABSTRACT

A method and apparatus for creating and recording management information for digital data streams by grouping transport stream units of a received transport stream into stream object units so that the maximum search time required for locating a specific position within a stream object unit is uniform among a plurality of stream object units. An example embodying the present invention varies the time length of each stream object unit depending upon the bit rate of the received transport stream and keeps the size of each stream object unit constant irrespective of the transfer rate of the data stream, thereby guaranteeing the maximum search time required for locating a transport stream packet within a stream object unit to be uniform.

20 Claims, 6 Drawing Sheets

*Conventional Art*

Conventional Art

*Conventional Art*

METHOD AND APPARATUS FOR CREATING AND RECORDING MANAGEMENT INFORMATION FOR DIGITAL DATA STREAMS

BACKGROUND OF THE INVENTION

1. Field of the Invention

The present invention relates to a method and apparatus for recording received digital data streams on a recording medium and creating and recording management information for the recorded digital data streams.

2. Description of the Related Art

In conventional analog television broadcast, video signals are transmitted over the air or through cables after being AM or FM modulated. With the recent rapid advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

In digital broadcast, a plurality of programs encoded based upon the MPEG format are multiplexed into a transport stream before transmitted. The transmitted transport stream is received by a set top box at the receiver and demultiplexed into a plurality of programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to store the received digital broadcast signals on a storage medium instead of directly outputting the received broadcast signals to A/V output devices. The stored digital broadcast signals can be edited and retrieved afterwards. For example, a digital data stream received by a set top box can be stored in a streamer such as a digital video disk (DVD) recorder through communication interfaces like an IEEE-1394 serial bus. Later, the stored digital data stream can be edited and transmitted back to the set top box so that the original digital audio and video data can be presented.

When a received digital data stream is recorded on a recording medium, management information regarding the digital data stream needs to be created and recorded on the recording medium. A conventional method for creating the management information will now be explained with reference to FIGS. 1 and 2.

If a user's request for recording an incoming data stream tuned by a tuning unit 110 has been received, a control unit 140 of a set top box 100 informs a control unit 250 of a streamer 200 that a recording mode is set and begins to transfer the received digital stream to the streamer 200 through an IEEE-1394 interface. The control unit 250 of the streamer 200 controls a stream recording unit 220 to record the received data stream on a recording medium 230. The transport stream packets (TS Pkt 1~TS Pkt k) constituting the data stream are recorded on the recording medium 230 along with respective transport stream packet arrival times (TS APATs), wherein the transport stream packets with packet arrival times are organized in sectors on the recording medium 230. When recording the digital stream, the control unit 250 of the streamer 200 groups the transport stream packets into stream object units (SOBU 1~SOBU q), with each stream object unit (SOBU) having a predetermined time length, for example, 0.5 s. The control unit 250 also creates a stream object unit size (SOBU_SZ) and a stream object unit presentation time (SOBU_TM) for each stream object unit (SOBU) and records the created information as management information for the associated stream object unit (SOBU). The stream object unit size (SOBU_SZ) of a stream object unit (SOBU) is expressed in terms of the number of sectors containing the stream object unit. If 20 stream object units (SOBUs) are created after 10 s elapses, the control unit 250 creates and records a stream object unit index number (SOBU_N) for the 20 stream object units.

The control unit 250 of the streamer 200 conducts the aforementioned task until the recording mode terminates, thereby creating a record (RCD) or program (PG). The digital stream recorded by a single recording operation is called a record (RCD) or program (PG). After the recording mode ends, the control unit 250 of the streamer 200 groups the created stream object units (SOBUs) into a stream object (SOB) and groups stream object unit sizes (SOBU_SZs) into a map. The map is recorded on the recording medium 230 as stream object information (SOBI).

Subsequently, the control unit 250 of the streamer 200 creates and records a presentation sequence information (Cell) with information linking it to the corresponding to the record (RCD) or program (PG).

If a user enters a search time (HH:MM:SS:FF) in order to search for a specific position on the recording medium 230, the control unit 250 of the streamer 200 detects a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 2. Then, the control unit 250 detects a Cell (Cell 2 shown in FIG. 2) corresponding to the user's search time (HH:MM:SS:FF) with reference to the presentation start time (C1_S_TM, C2_S_TM, □, Cn_S_TM) and presentation end time (C1_E_TM, C2_E_TM, □, Cn_E_TM) of each Cell contained in the detected program PG2.

Referring to the stream object information (SOBI) of the stream object SOB2 associated with the detected presentation sequence information Cell 2, the control unit 250 subtracts the stream object start time (SOB_S_TM) from the user's search time (HH:MM:SS:FF). The control unit 250 searches for a stream object unit (SOBU) based upon the size accumulated up to the stream object unit (SOBU) in which the presentation time accumulated up to the stream object unit (SOBU) is closest to the subtraction result without exceeding it.

Suppose that the stream object unit detected by the above-mentioned procedure is SOBUg shown in FIG. 2. As a next step, the control unit 250 detects the transport stream packet arrival time (TS APAT) of each transport stream packet from the first sector Sector 1 containing the detected stream object unit SOBUg and compares the packet arrival time with the user's search time (HH:MM:SS:FF). The control unit 250 starts to retrieve recorded data from the transport stream packet whose packet arrival time is after the user's search time and controls a stream reproducing unit 240 so that the retrieved data can be transferred to the set top box 100 through the IEEE-1394 interface 210.

As explained thus far, each stream object unit created by the conventional data stream recording method has a predetermined time length. Therefore, in the instance where the transport stream packet corresponding to the user's search time is the last transport stream packet recorded in the last sector (Sector n) of the associated stream object unit (SOBUg) as shown in FIG. 3, a significant search time is required to locate the target transport stream packet. This is because it takes time to obtain the packet arrival time of the last transport stream packet recorded in the last sector (Sector n) since the packet arrival time of the first transport stream packet recorded in the first sector (Sector 1) has been detected.

The required search time can be fairly reduced by decreasing the time length of each stream object unit. In this case, however, the number of stream object units (SOBUs) increases, which inevitably entails increased amount of overall navigation data as the management data regarding stream object units also increases.

In addition, since the time length of each stream object unit is fixed, the size of each stream object unit depends on the bit rate of the input data stream. For example, if an input digital data stream has a bit rate of 10 Mbps, the size of a stream object unit (SOBU) amounts to about 5 Mbit and thus the maximum search time required for locating a transport stream packet within a stream object unit (SOBU) is about 500 ms. In contrast, in the case of a data stream with a bit rate of 0.5 Mbps, a stream object unit (SOBU) has a size of 500 Kbit and the maximum search time required for locating a transport stream packet within a stream object unit (SOBU) amounts to about 50 ms.

Unless every recorded program or record has the same transfer rate, the size of a stream object unit varies depending on the transfer rate as shown in FIG. 4. The maximum search time, therefore, increases in proportion to the size of a stream object unit and transfer rate. Consequently, the search time is dependent upon the transfer rates of data streams in the conventional method, which may result in confusions and problems.

SUMMARY OF THE INVENTION

It is an object of the present invention to provide a method and apparatus for creating and recording management information for digital data streams. When recording a received digital transport stream on a recording medium, stream object units are created so that the maximum search time required for locating a specific position within a stream object unit is uniform among recorded stream object units.

The method for recording management information for digital data streams in accordance with the present invention records each transport stream unit of a received transport stream along with its arrival time on a recording medium by grouping the transport stream units into stream object units of a predetermined size so that the maximum search time required for locating a specific position within a stream object unit is uniform and creates and records reproduction management information regarding the stream object units

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
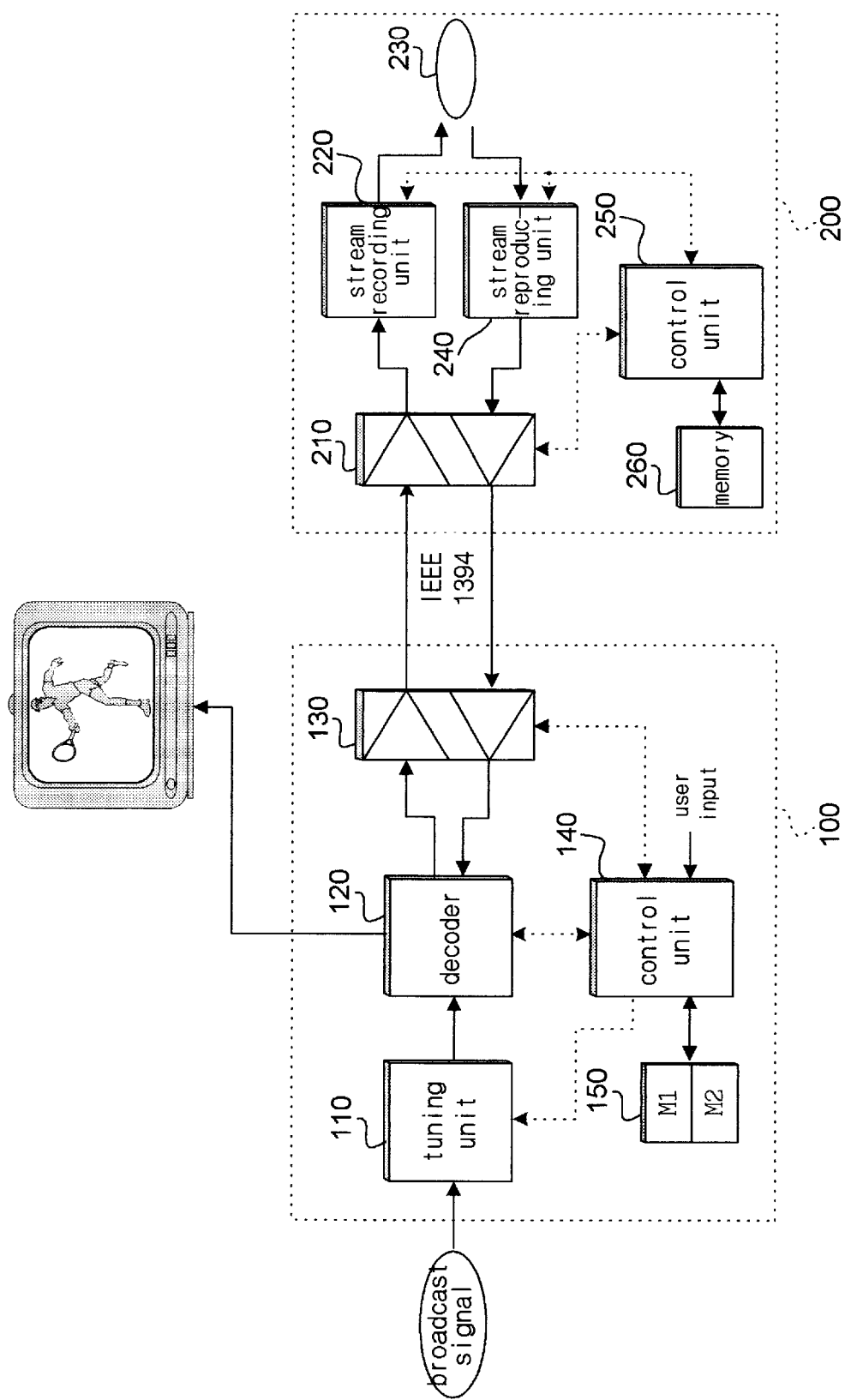
FIG. 1 is a block diagram of an apparatus in which the present invention can be advantageously employed.
Figure 2:
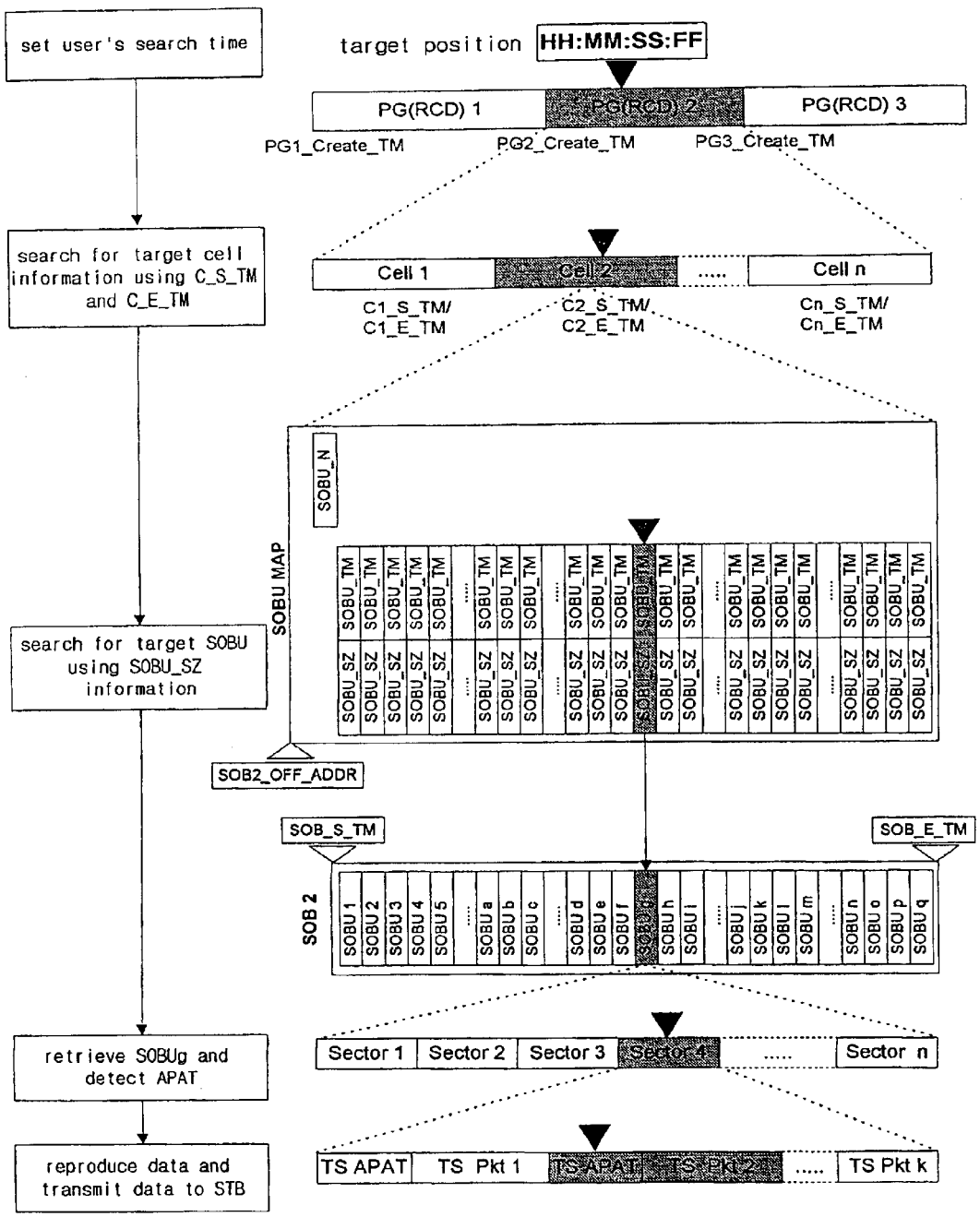
FIG. 2 is a pictorial representation showing the syntax of the recorded data and the management information regarding the recorded data for explaining a conventional method for creating management information for data streams recorded on a recording medium and searching for recorded data using the management information.
Figure 3:
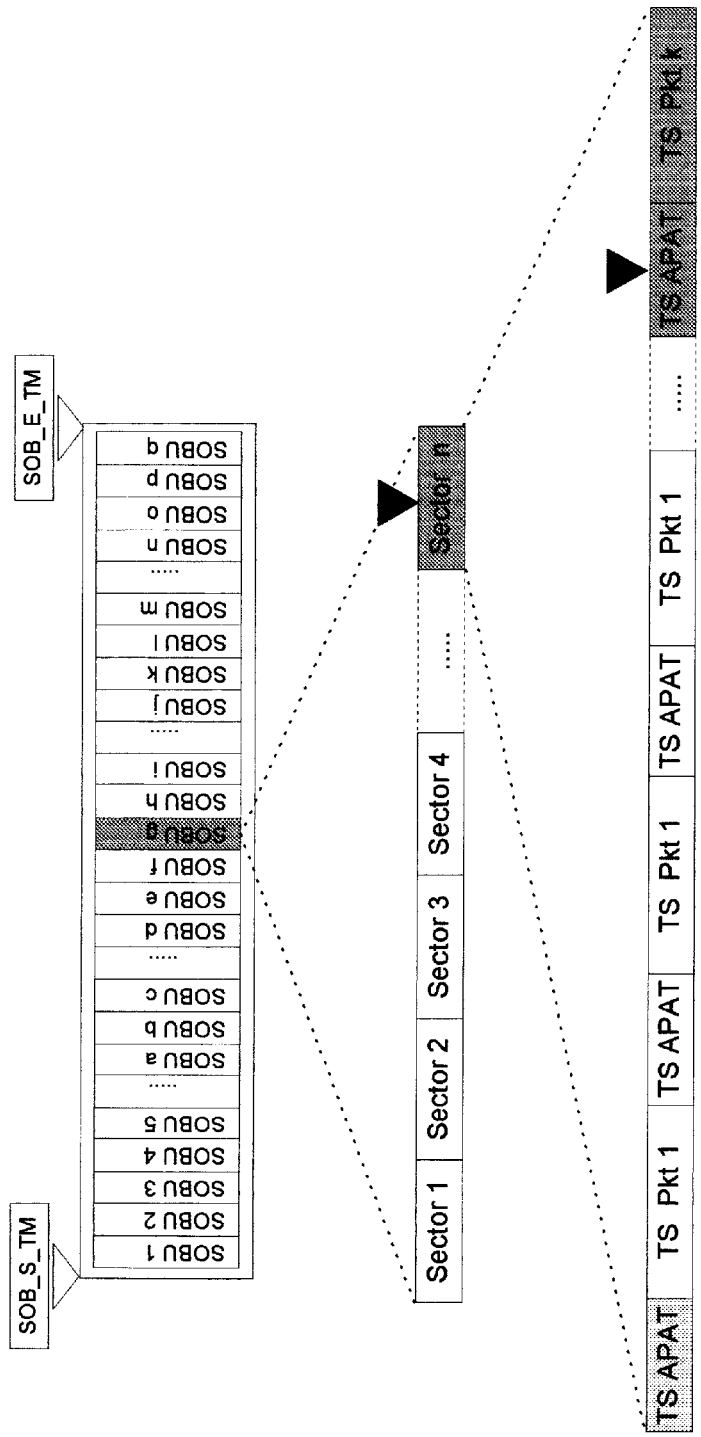
FIG. 3 is a pictorial representation for explaining the problem of the conventional method shown in FIG. 2.
Figure 4:
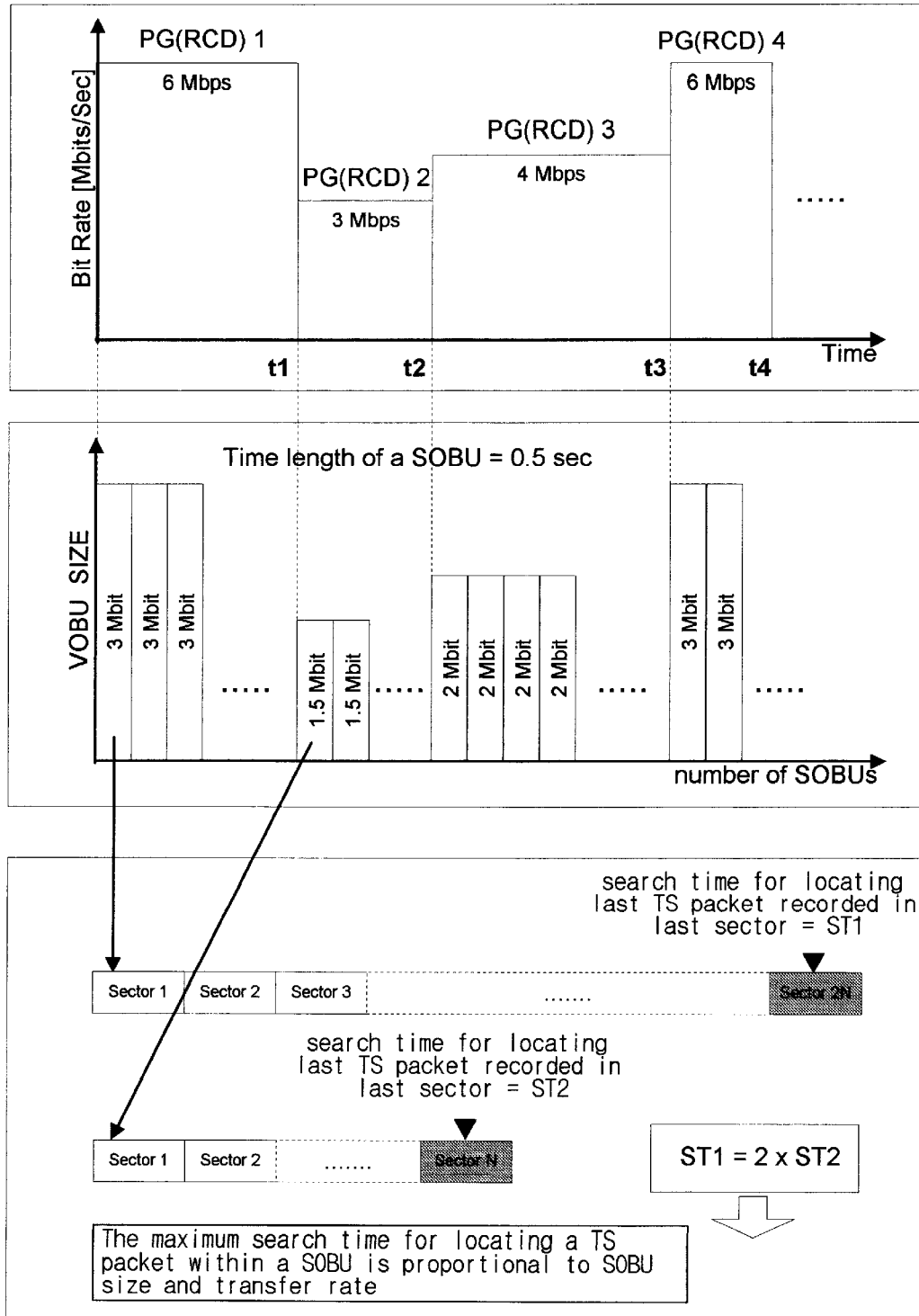
FIG. 4 is a pictorial representation showing the size of a stream object unit created by the conventional method.

FIG. 1 depicts a block diagram of an apparatus in which the present invention may be advantageously employed. The apparatus comprises a set top box 100, a communication interface (IEEE-1394), and a streamer 200.

The set top box 100 receives transport streams encoded by system encoders and broadcast by a plurality of broadcast stations and demultiplexes the received transport streams. After a decoder 120 decodes the transport stream of a program tuned by a tuning unit 110, a control unit 140 outputs the decoded transport stream to an A/V output apparatus or to the streamer 200 through the IEEE-1394 communication interface for recording the transport stream.

In the set top box 100, the program service information (SI) contained in the transport stream of the program tuned by the tuning unit 110 is decoded by a decoder 120 and transmitted to a control unit 140. The control unit 140 stores the program service information (SI) in the program information area (M1) of a memory 150. The program service information (SI) includes information on all programs of every received channel, such as channel numbers, channel names, program names, schedules, program categories, attributes of streams constituting each program, etc.

The control unit 140 may constitute a program table having a time axis and a channel axis using the program service information (SI) stored in the program information area M1 of the memory 150 and display the program table on a television screen.

The set top box 100 may transmit a program chosen by a user through the IEEE-1394 interface to the streamer 200 so that the transmitted program is recorded on a recording medium 230 such as a digital video disk by the streamer 200.

In addition, requested by a user, the set top box 100 may receive a program retrieved from recording medium 230 by the streamer 200 through the IEEE-1394 communication interface so that the received program can be presented on a television after being decoded by the decoder 120.

The method for creating and recording management information for a digital data stream in accordance with an embodiment of the present invention will now be explained with reference to FIGS. 1 and 5.

If a user's request for recording an incoming data stream tuned by the tuning unit 110 shown in FIG. 1 has been received, the control unit 140 of the set top box 100 informs a control unit 250 of the streamer 200 that a recording mode is set and begins to transfer the received digital stream to the streamer 200 through an IEEE-1394 interface. The control unit 140 of the set top box 100 detects the bit transfer rate of the received data stream and transfers the detected bit transfer rate to the streamer 200, wherein the bit transfer rate can be obtained by detecting the elementary stream rate (ES rate) contained in the header of each packetized elementary stream packet (PES packet) or the piecewise rate (PW rate) contained in the header of each transport stream packet.

The control unit 250 of the streamer 200 controls a stream recording unit 220 so that the data stream received through the IEEE-1394 interface can be recorded on the recording medium 230. The transport stream packets (TS pkt 1~TS pkt k) constituting the data stream are organized in sectors (Sector 1~Sector n) on the recording medium 230 along with respective packet arrival times expressed in terms of internal clock values. The control unit 250 of the streamer 200 varies the time length of a stream object unit (SOBU) depending upon the bit transfer rate of the received data stream transmitted by the set top box 100.

First, the minimum time length of a stream object unit (SOBU), the upper threshold value of the transfer rate (Upper_Th_Rate), and the lower threshold value of the transfer rate (Lower_Th_Rate) are determined. Suppose that the minimum time length, the upper threshold value, and the lower threshold value are set to 0.1 s, 7 Mbps, and 4 Mbps, respectively. If the transfer rate of a data stream (S_RATE) is equal to or greater than the upper threshold rate (Upper_Th_Rate), the data stream is classified into Type 1 and the minimum time length 0.1 s is assigned as the time length of a stream object unit (SOBU) associated with the data stream. If the transfer rate of a data stream (S_RATE) is less than upper threshold rate (Upper_Th_Rate) but greater than the lower threshold rate (Lower_Th_Rate), the data stream is classified into Type 2. The stream object unit (SOBU) associated with the data streams belonging to Type 2 has a time length of 0.2 s which is the minimum time length 0.1 s multiplied by a predetermined weighting factor 2. Data streams which do not belong to either Type 1 or Type 2 are classified into Type 3 and the stream object unit (SOBU) associated with data streams of Type 3 has a time length of 0.3 s which is the minimum time length 0.1 s multiplied by a predetermined weighting factor 3. It is desirable to record the time length of a stream object unit (SOBU) in the stream object information (SOBI) area because the transfer rate of a program remains unchanged and therefore every stream object unit (SOBU) belonging to a stream object (SOB) has the same time length.

The minimum time length of a stream object unit (SOBU) 0.1 s, the upper threshold rate 7 Mbps, the lower threshold rate 4 Mbps, and the weighting values 2 and 3 mentioned before are simply illustrative values and thus can be set differently. Likewise, it is also possible to increase or decrease the number of data stream groups and assign an appropriate weighting factor to each data stream group though digital data streams are classified into three groups depending on their transfer rates in the previous example.

With reference to the time information contained in the transport stream packet such as the program clock reference (PCR), packet arrival time (PAT), or presentation time stamp (PTS), the control unit 250 of the streamer 200 records the received data stream as a series of stream object units (SOBU 1~SOBU q), each stream object unit having a time length determined by the transfer rate of the received data stream. In addition, the stream object unit size (SOBU_SZ) of a stream object unit expressed in terms of the number of sectors containing the stream object unit is recorded as management information of the stream object unit (SOBU). If a predetermined number, for example 20, of stream object units are created while repeating the above task, the control unit 250 creates and records a stream object unit index number (SOBU_N), an accumulated presentation time (ACC_TM), and an accumulated size (ACC_SZ) for the 20 stream object units. The accumulated presentation time (ACC_TM) and accumulated size (ACC_SZ) for each of 20 stream object units are the presentation time and size accumulated from the start position (SOB#n_OFF_ADDR) of the stream object (SOB#n) containing the associated stream object units to each of 20 stream object units, respectively.

The control unit 250 of the streamer 200 performs the aforementioned operation until the recording mode terminates, thereby creating a record (RCD) or program (PG). After the recording mode ends, the control unit 250 of the streamer 200 groups the recorded stream object units (SOBUs) into a stream object (SOB) and groups the recorded accumulated sizes (ACC_SZs), the recorded accumulated presentation times (ACC_TMs) and the created stream object unit sizes (SOBU_SZs) into a map. The map is recorded as stream object information (SOBI).

Subsequently, the control unit 250 of the streamer 200 creates a presentation sequence information (Cell) for the map and records it as the cell information corresponding to the record or program.

Figure 6:
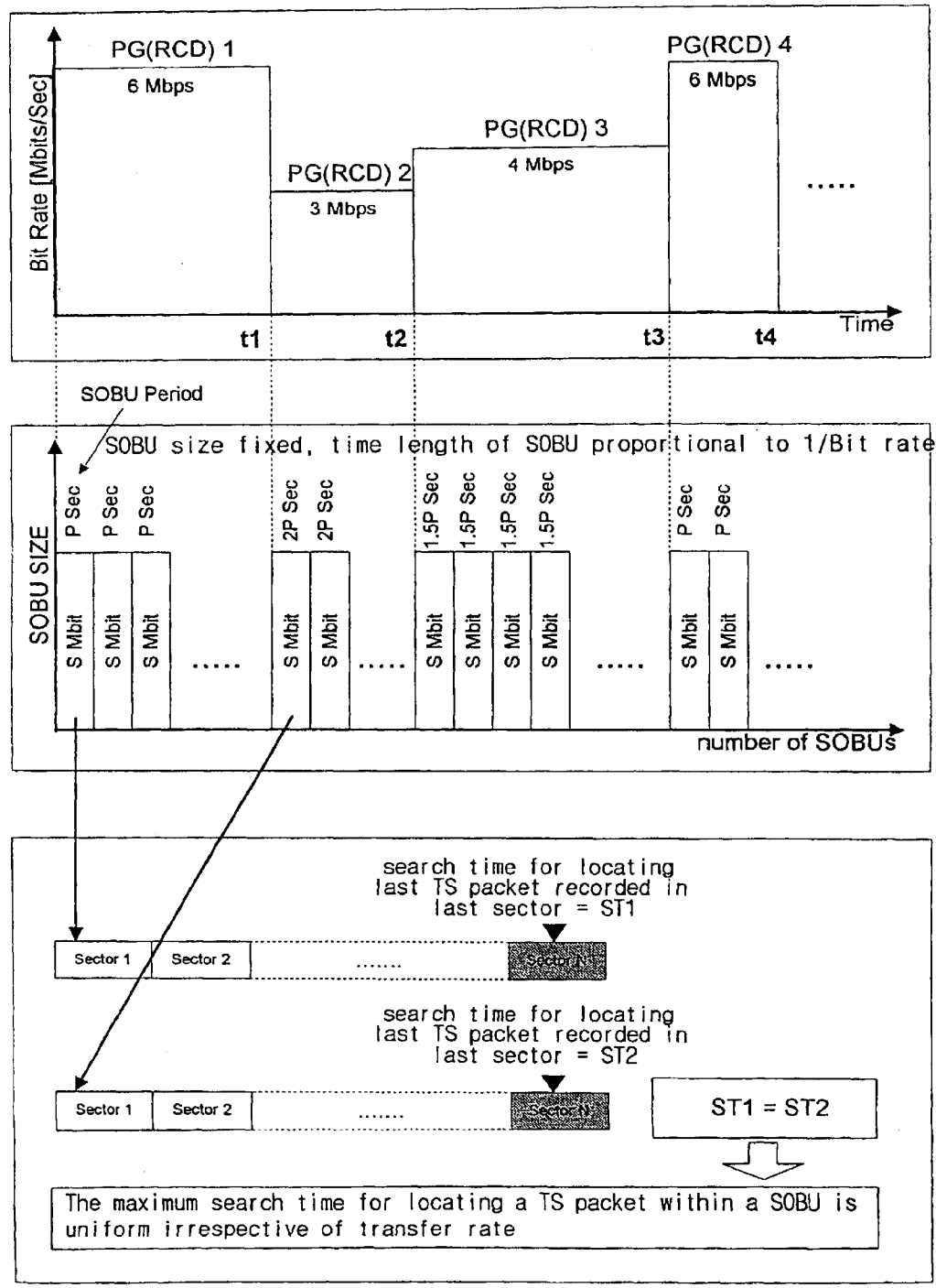
FIG. 6 is a pictorial representation showing the size of a stream object unit created by the present invention.

Let us consider the size of a stream object unit (SOBU) recorded by the embodiment of the present invention. Suppose that as shown in FIG. 6 the programs PG 1, PG 2, PG 3, and PG4 have transfer rates of 6 Mbps, 3 Mbps, 4 Mbps, and 6 Mbps, respectively. Also, suppose that the weighting factors are set to 1.5 and 2 and the upper threshold rate (Upper_Th_Rate) and lower threshold rate (Lower_Th_Rate) are set to 6 Mbps and 3 Mbps, respectively.

Since the transfer rate (S_RATE) of the program PG 1 or RCD 1 is equal to the upper threshold rate 6 Mbps, the program PG1 is classified into Type 1. Assume that the time length of each stream object unit (SOBU) of the program PG 1 is set to P s and the size of each stream object unit (SOBU) amounts to S Mbit. Since the transfer rate (S_RATE) of the program PG 2 or RCD 2 is equal to the lower threshold rate 3 Mbps, the program PG 2 is classified into Type 3. In this case, the time length of each stream object unit (SOBU) of the program PG 2 is 2 P s and the size of each stream object unit is S Mbit. Likewise, the program PG 3 is classified into Type 2. Therefore, the time length of each stream object unit (SOBU) of the program PG 3 is 1.5 P s and the size of each stream object unit is S Mbit.

As seen from FIG. 6, the size of each stream object unit (SOBU) remains identical without regard to the transfer rates of input data streams, thereby guaranteeing the maximum search time required for locating a transport stream packet within a stream object unit (SOBU) to be uniform.

If a user enters a search time (HH:MM:SS:FF) in order to search for a specific position on the recording medium 230, the control unit 250 of the streamer 200 detects a record (RCD) or program (PG) corresponding to the user's search time (HH:MM:SS:FF) with reference to the creation times (PG1_Create_TM, PG2_Create_TM, PG3_Create_TM) of records (RCD1~RCD3) or programs (PG1~PG3). Suppose the detected program is PG2 shown in FIG. 5. Then, the control unit 250 detects a Cell (Cell 2 shown in FIG. 5) corresponding to the user's search time (HH:MM:SS:FF)

with reference to the presentation start time (C1_S_TM, C2_S_TM, □, Cn_S_TM) and presentation end time (C1_E_TM, C2_E_TM, □, Cn_E_TM) of each Cell contained in the detected program PG2. Obtaining the time length of a stream object unit (SOBU) from the stream object information (SOBI) concerning the stream object SOB 2 associated with the detected cell Cell 2, control unit 250 multiplies the stream object unit index number (SOBU_N) by the obtained time length. The control unit 250 searches for an accumulated entry (ACC Entry: the entry to access, which is gray-marked in FIG. 5,) containing the stream object index number (SOBU_N) in which the multiplication result is closest to the difference between the user's search time (HH:MM:SS:FF) and the stream object start time (SOB_S_TM) without exceeding it. Next, the control unit 250 searches for a target stream object unit (SOBU) containing the user's search time by multiplying the time length of a stream object by the number of stream object units counted from the stream object unit pointed to by the detected accumulated entry (ACC Entry). The position of the target stream object unit (SOBU) can be obtained by adding the accumulated size (ACC_SZ) of the target accumulated entry (ACC Entry) to the sum of stream object sizes (SOBU_SZs) calculated from the stream object unit pointed to by the target accumulated entry (ACC Entry).

Figure 5:
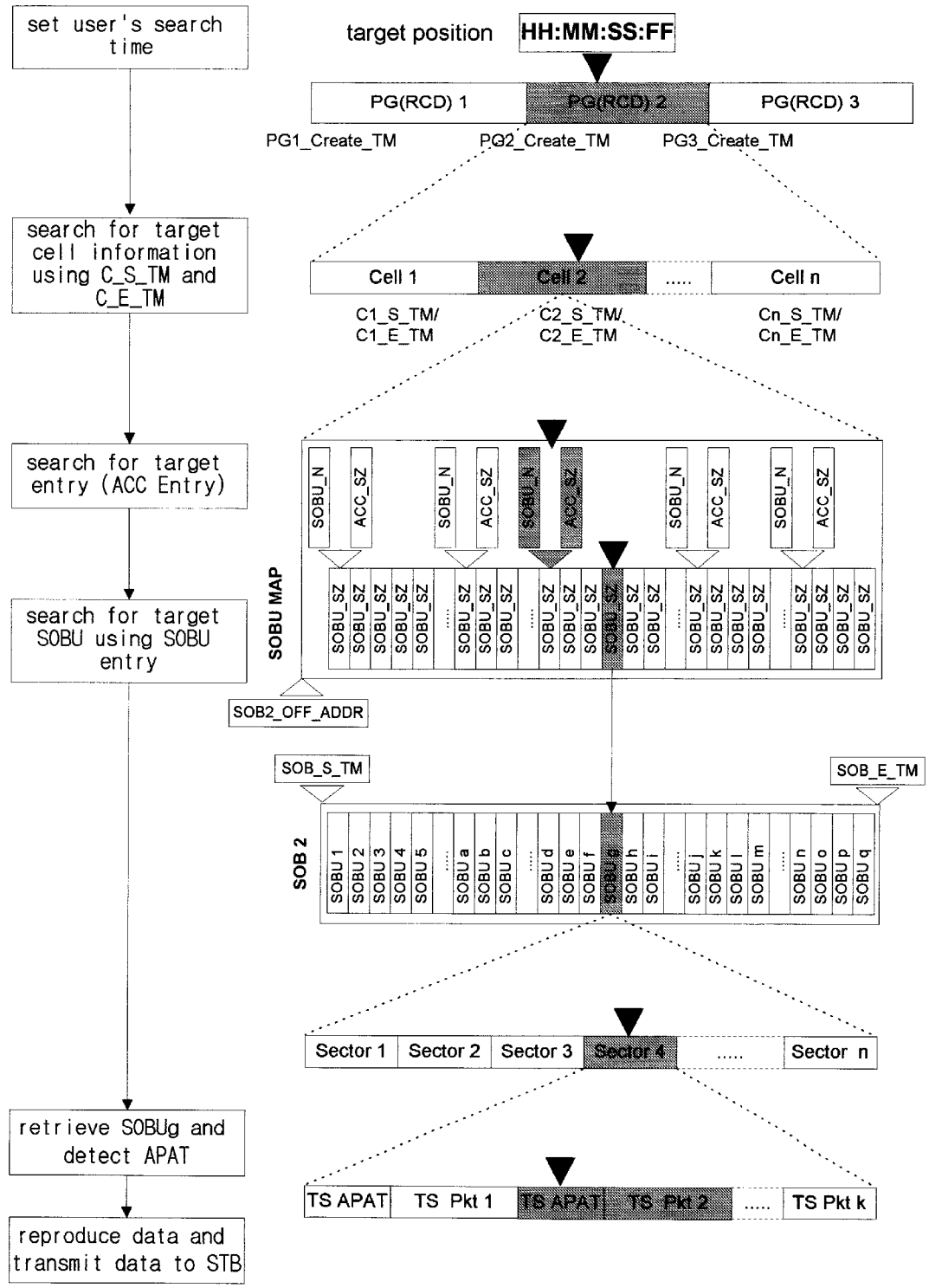
FIG. 5 is a pictorial representation showing the syntax of the recorded data and the management information regarding the recorded data created by the present invention.

Suppose that the stream object unit detected by the above-mentioned procedure is SOBUg shown in FIG. 5. As a next step, the control unit 250 detects the transport stream packet arrival time (TS APAT) of each transport stream packet from the first sector Sector 1 containing the detected stream object unit SOBUg and compares the packet arrival time with the user's search time (HH:MM:SS:FF). The control unit 250 starts to retrieve recorded data from the transport stream packet whose packet arrival time is after the user's search time and controls a stream reproducing unit 240 so that the retrieved data can be transferred to the set top box 100 through the IEEE-1394 interface 210.

The invention may be embodied in other specific forms. For example, the invention is not only applicable to the apparatus shown in FIG. 1 but applicable to any system comprising a subsystem functioning as a set top box, another subsystem functioning as streamer, and a communication interface between the two systems.

In the previous embodiment, the set top box detected the bit rate of a data stream and transmits the detected value to the streamer. It is also possible, however, for the streamer to calculate the bit rate by detecting the elementary stream rate (ES rate) contained in the header of each packetized elementary stream packet (PES packet) or the piecewise rate (PW rate) contained in the header of each transport stream packet after scrambling and decoding the input data stream.

Instead of calculating the bit rate of a data'stream form the ES rate or PW rate, the data transfer rate information such as the ES rate or PW rate can be used directly. Also, the bit rate can be calculated from the amount of data between two consecutive program clock references (PCRs) contained in the data stream, wherein the bit rate is given as [the data amount (in bytes)×system clock frequency]/[PCR j−PCR i].

In the previous embodiment, it was assumed that the bit rate of a program remained unchanged throughout the program. The present invention is still applicable to data streams in which the upper and lower limits of the bit rate of the data stream are given.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording digital data streams being received, comprising the steps of:
    (a) recording transport stream units of the digital data streams along with their transport time references representing the arrival times of the transport stream units on a recording medium, each transport stream unit having a predetermined length;
    (b) grouping the transport stream units into stream object units of a predetermined size so that the maximum search time for a stream object unit is uniform among the recorded stream object units; and
    (c) creating and recording reproduction management information regarding the stream object units.

2. A method set forth in claim 1, wherein said step (b) varies the time length of stream object units to be grouped based upon the bit rate of the received transport stream.

3. A method set forth in claim 2, wherein said step (b) determines the time length of each stream object units to be grouped based upon the range to which the bit rate of the received transport stream belongs, more than two ranges of bit rate having been classified.

4. A method set forth in claim 2, wherein said step (b) obtains the information on the bit rate of the transport stream from the transfer rate information contained in the received transport stream.

5. A method set forth in claim 2, wherein said step (b) calculate the bit rate of the transport stream using two consecutive program clock references contained in the received transport stream and the amount of data between the two program clock references.

6. A method for recording digital data streams being received, comprising the steps of:
    recording transport stream units of the digital data streams along with their transport time references representing the arrival times of the transport stream units on a recording medium, each transport stream unit having a predetermined length;
    grouping the transport stream units into stream object units of a predetermined size so that the maximum search time for a stream object unit is uniform among the recorded stream object units; and
    creating and recording information on said grouping of the stream object units.

7. The method set forth in claim 6, wherein the grouping information is the information on the reference time when stream object units are grouped.

8. A method for recording digital data streams being received, comprising the steps of:
    recording transport stream units of the digital data streams along with their transport time references representing the arrival times of the transport stream units on a recording medium, each transport stream unit having a predetermined length;
    grouping the transport stream units into stream object units of a predetermined size so that the maximum search time for a stream object unit is uniform among the recorded stream object units; and
    creating information for accessing every predetermined number of the stream object units.

9. A method set forth in claim 8, wherein the accessing information is the information on the distance apart from the initial recording position of the digital data stream.

10. A method set forth in claim 9, wherein the distance information is the information on the stream object unit size accumulated from the initial recording position.

11. A method set forth in claim 8, further comprising the step of recording the accessing information along with the information on the size of each stream object unit on the recording medium as management information for search operations.

12. An apparatus for recording digital data streams being received, comprising:

clock means for generating arrival time of every transport stream unit of the digital data streams, the transport stream unit having a predetermined length;

recording means for recording the transport stream unit along with the generated arrival time on a recording medium; and control means for grouping the transport stream units into stream object units so that the maximum search time for a stream object unit is uniform among the recorded stream object units, creating reproduction management information regarding the stream object units, and controlling said recording means to record the created reproduction management information, wherein the stream object unit has a predetermined size.

13. An apparatus set forth in claim 12, wherein said control means varies the time length of stream object units to be grouped based upon the bit rate of the received transport stream.

14. An apparatus for recording digital data streams being received, comprising:

clock means for generating arrival time of every transport stream unit of the digital data streams, the transport stream unit having a predetermined length;

recording means for recording the transport stream unit along with the generated arrival time on a recording medium; and control means for grouping the transport stream units into stream object units so that the maximum search time for a stream object unit is uniform among the recorded stream object units, creating information on the grouping of the stream object units, and controlling said recording means to record the created grouping information, wherein the stream object unit has a predetermined size.

15. An apparatus set forth in claim 14, wherein said grouping information is the information on the reference time when stream object units are grouped.

16. An apparatus for recording digital data streams being received, comprising:

clock means for generating arrival time of every transport stream unit of the digital data streams, the transport stream unit having a predetermined length;

recording means for recording the transport stream unit along with the generated arrival time on a recording medium; and control means for grouping the transport stream units into stream object units so that the maximum search time for a stream object unit is uniform among the recorded stream object units, creating information for accessing every predetermined number of the stream object units, and controlling said recording means to record the created accessing information, wherein the stream object unit has a predetermined size.

17. An apparatus set forth in claim 16, wherein the accessing information is the information on the distance apart from the initial recording position of the digital data stream.

18. An apparatus for recording digital data streams being received, comprising:

a clock generator to generate arrival time of every transport stream unit of the digital data streams, the transport stream unit having a predetermined length;

a recorder to record the transport stream unit along with the arrival time generated from said clock generator on a recording medium; and a controller to group the transport stream units recorded by said recorder into stream object units so that the maximum search time for a stream object unit is uniform among the recorded stream object units, to create reproduction management information regarding the stream object units, and to control said recorder to record the created reproduction management information, wherein the stream object unit has a predetermined size.

19. An apparatus for recording digital data streams being received, comprising:

a clock generator to generate arrival time of every transport stream unit of the digital data streams, the transport stream unit having a predetermined length;

a recorder to record the transport stream unit along with the arrival time generated from said clock generator on a recording medium; and a controller to group the transport stream units recorded by said recorder into stream object units so that the maximum search time for a stream object unit is uniform among the recorded stream object units, to create information on the grouping of the stream object units, and to control said recorder to record the created grouping information, wherein the stream object unit has a predetermined size.

20. An apparatus for recording digital data streams being received, comprising:

a clock generator to generate arrival time of every transport stream unit of the digital data streams, the transport stream unit having a predetermined length;

a recorder to record the transport stream unit along with the arrival time generated from said clock generator on a recording medium; and a controller to group the transport stream units recorded by said recorder into stream object units so that the maximum search time for a stream object unit is uniform among the recorded stream object units, to create information for accessing every predetermined number of the stream object units, and to control said recorder to record the created accessing information, wherein the stream object unit has a predetermined size.

* * * * *